US009350814B2

(12) United States Patent
Mahendran et al.

(10) Patent No.: US 9,350,814 B2
(45) Date of Patent: May 24, 2016

(54) INTERNET PROTOCOL CONNECTIVITY OVER A SERVICE-ORIENTED ARCHITECTURE BUS

(75) Inventors: Arungundram Chandrasekeran Mahendran, San Diego, CA (US); Nishith K. Chaubey, San Diego, CA (US); Xun Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1130 days.

(21) Appl. No.: 13/400,889

(22) Filed: Feb. 21, 2012

(65) Prior Publication Data

US 2013/0219010 A1 Aug. 22, 2013

(51) Int. Cl.
*G06F 15/16* (2006.01)
*H04L 29/08* (2006.01)
*H04L 29/12* (2006.01)

(52) U.S. Cl.
CPC .......... *H04L 67/16* (2013.01); *H04L 61/2046* (2013.01); *H04L 67/1061* (2013.01); *H04L 61/1511* (2013.01); *H04L 61/2007* (2013.01); *H04L 61/2038* (2013.01)

(58) Field of Classification Search
CPC .. H04L 61/1511; H04L 67/16; H04L 61/2015
See application file for complete search history.

(56) References Cited

U.S. PATENT DOCUMENTS

| 5,781,550 A | 7/1998 | Templin et al. |
| 6,101,499 A | 8/2000 | Ford et al. |
| 7,072,650 B2 | 7/2006 | Stanforth |
| 7,088,727 B1 | 8/2006 | Short et al. |
| 7,142,866 B2 | 11/2006 | Windham et al. |
| 7,174,363 B1 | 2/2007 | Goldstein et al. |
| 7,468,954 B2 | 12/2008 | Sherman et al. |
| 7,808,960 B1 | 10/2010 | Chan et al. |
| 7,873,019 B2 | 1/2011 | Dawson et al. |
| 7,937,088 B2 | 5/2011 | Nanda |

(Continued)

FOREIGN PATENT DOCUMENTS

| WO | 2007055689 A1 | 5/2007 |
| WO | 2010041914 A2 | 4/2010 |

OTHER PUBLICATIONS

Ratanchandani P. et al., "A hybrid approach to internet connectivity for mobile ad hoc networks", 2003 IEEE Wireless Communications and Networking Conference Record : Mar. 16-20, 2003, New Orleans, Louisiana, USA, IEEE Operations Center, Piscataway, NJ, vol. 3, Mar. 16, 2003, pp. 1522-1527, XP010639995, DOI: 10.1109/WCNC.2003.1200612,ISBN: 978-0-7803-7700-4.

(Continued)

*Primary Examiner* — Djenane Bayard
(74) *Attorney, Agent, or Firm* — Charles E. Eggers

(57) ABSTRACT

Methods, systems, and devices are disclosed for implementing Internet Protocol (IP) connectivity over a service-oriented architecture (SOA) bus implemented by a peer-to-peer network. At a first device, a first IP service is advertised over the SOA bus, and a second IP service advertised by a second device over the SOA bus is discovered. The first device may transmit at least a first IP packet to the second device by remotely invoking the second IP service of the second device over the SOA bus. The first device may receive at least a second IP packet from the second device over the SOA bus through an invocation of the first IP service by the second device.

43 Claims, 12 Drawing Sheets

(56) References Cited

U.S. PATENT DOCUMENTS

| | | | |
|---|---|---|---|
| 2005/0027871 | A1 | 2/2005 | Bradley et al. |
| 2006/0114881 | A1 | 6/2006 | Chari et al. |
| 2006/0126535 | A1 | 6/2006 | Sherman et al. |
| 2006/0291434 | A1* | 12/2006 | Gu et al. ............... 370/338 |
| 2008/0032801 | A1* | 2/2008 | Brunet de Courssou ....... 463/42 |
| 2008/0183853 | A1 | 7/2008 | Manion et al. |
| 2009/0073919 | A1 | 3/2009 | Chen |
| 2009/0157728 | A1* | 6/2009 | Fletcher et al. ............... 707/102 |
| 2009/0248793 | A1* | 10/2009 | Jacobsson et al. ............ 709/203 |
| 2010/0293289 | A1 | 11/2010 | Hsu et al. |
| 2011/0013509 | A1 | 1/2011 | Zhou et al. |
| 2011/0149956 | A1* | 6/2011 | Alt et al. ............... 370/352 |
| 2011/0228699 | A1 | 9/2011 | Shin et al. |
| 2013/0346442 | A1* | 12/2013 | Roshen ............... 707/769 |
| 2014/0254595 | A1 | 9/2014 | Luo et al. |

OTHER PUBLICATIONS

Sethom K. et al., "Distributed virtual network interfaces to support intra-PAN and PAN-to-infrastructure connectivity", Global Telecommunications Conference, 2005. GLOBECOM '05. IEEE St. Loius, MO, USA Nov. 28-Dec. 2, 2005, Piscataway, NJ, USA,IEEE, vol. 6, Nov. 28, 2005, pp. 3554-3558, XP010882301, DOI: 10.1109/GL0C0M.2005.1578434, ISBN: 978-0-7803-9414-8.

Wakikawa R. et al., "Global connectivity for IPv6 Mobile Ad Hoc Networks; draft-wakikawa-manet-globalv6-02.txt", Nov. 3, 2002, No. 2, Nov. 3, 2002, XP015005658, ISSN: 0000-0004.

Hamidian A.A., "A Study of Internet Connectivity for Mobile Ad Hoc Networks in NS"., Jan. 2, 2003, Department of Communication Systems, Lund Institute of Technology, Lund University, pp. 13-19, 23, 25, 29, 39-43, 46-48.

Ryuji., W., et al., "Global Connectivity for IPv6 Mobile Ad Hoc Networks draft-wakikawa-manet-globalv6-00.txt"., Nov. 2001, Mobile Ad Hoc Networking Working Group Internet Draft, p. 9.

Hwang, et al., "Mobile IPv6-based ad hoc networks: its development and application," IEEE Journal on Selected Area in Communications, Nov. 2005, vol. 23, Issue 11, pp. 2161-2171.

Wolinsky, et al., "Addressing the P2P Bootstrap Problem for Small Overlay Networks," 2010 IEEE Tenth International Conference on Peer-to-Peer Computing, IEEE 2010, 10 pages.

International Search Report and Written Opinion—PCT/US2013/026479—ISA/EPO—May 31, 2013.

Liao W.H., et al., "GRID: A Fully Location-Aware Routing Protocol for Mobile Ad Hoc Networks," Telecommunication Systems, 2001, pp. 37-60, vol. 18 (1-3).

Papazoglou, Mike P. et al, "Service oriented architectures: approaches, technologies and research issues", The VLDB Journal, The International Journal on Very Large Data Bases, Mar. 3, 2007, Springer, Berlin, DE, vol. 16, No. 3, pp. 389-415, XP019519922, ISSN: 0949-877X, DOI: 10.1007/S00778-007-0044-3.

* cited by examiner

INTERNET PROTOCOL CONNECTIVITY OVER A SERVICE-ORIENTED ARCHITECTURE BUS

BACKGROUND

The following relates generally to service-oriented architectures (SOAs), and in particular to the implementation of network communications over an SOA bus.

In a service-oriented architecture, one or more nodes may communicate with each other to offer each other interoperable services. In this context, a service can be thought of as an autonomous unit of functionality implemented by self-contained software. A typical implementation of service-oriented architecture functionality may include a number of computer nodes interconnected by a computer network. Each node may communicate with the other nodes to identify services offered by the other nodes. Each node may also advertise one or more services to the other nodes.

For a first node to invoke a service offered by a second node in a service-oriented architecture, the first node may transmit a remote procedure call to the second node, the remote procedure call being supported by the selected service. The remote procedure call may include one or more arguments or other parameters provided by the first node. The second node may respond to the remote procedure call by executing one or more software functions based on the type of call and/or the parameters provided. In some examples, the second node may provide a result of the remote procedure call to the first node.

Recently, the use of service-oriented architecture buses (also known as service buses) has increased. Service-oriented architecture buses facilitate communication between mutually interacting software applications to allow the applications to invoke each other's services. As the use of service-oriented architecture buses grows, new uses of these buses continue to develop.

SUMMARY

Embodiments include methods, systems, and devices for implementing Internet Protocol (IP) connectivity and communications over a service-oriented architecture (SOA) bus. In general, a first device and a second device may be communicatively coupled with an SOA bus. The first device may advertise a first IP service over the SOA bus, and the second device may advertise a second IP service over the SOA bus. The devices may discover each other's services and exchange IP packets by remotely invoking each other's advertised IP services over the SOA bus.

Some embodiments may include a method of implementing IP connectivity. The method may include advertising a first IP service at a first device over an SOA bus and discovering a second IP service advertised by a second device over the SOA bus. A first IP packet may be transmitted to the second device by remotely invoking the second IP service of the second device over the SOA bus. At least a second IP packet may be received from the second device over the SOA bus through the first advertised service.

In some embodiments, advertising the first IP service over the SOA bus may include advertising the first IP service over the SOA bus using a service name associated with the first IP service, the service name associated with the first IP service comprising a service descriptor uniformly associated with IP service at the SOA bus. The service name associated with the first IP service may include a unique IP address assigned to the first device.

In some embodiments, a first IP address may be dynamically generated for the first device, and a determination may be made of whether any other device on the SOA bus is associated with the dynamically generated IP address. If it is determined that no other device on the SOA bus is associated with the dynamically generated IP address, the dynamically generated IP address may be assigned as the unique IP address of the first device. In some examples, the determination that no other device on the SOA bus is associated with the dynamically generated IP address may include determining that a different service on the SOA bus is associated with the dynamically generated IP address, determining that the different service has a unique identifier assigned to the first device, and determining that the different service belongs to the first device based on the unique identifier. In some examples, the dynamically generated IP address may be abandoned in response to a determination that another device on the SOA bus is associated with the dynamically generated IP address, and a new IP address may be dynamically generated for the first device.

In some embodiments, discovering the second IP service advertised by the second device over the SOA bus may include discovering a service name associated with the second IP service over the SOA bus, the service name associated with the second IP service having the service descriptor uniformly associated with IP service at the SOA bus. The service name associated with the first IP service and the service name associated with the second IP service may be advertised in a contiguous namespace implemented by the SOA bus.

In some embodiments, the service name associated with the second IP service further comprises a unique IP address assigned to the second device. The first IP packet may be addressed to the unique IP address assigned to the second device. The second IP packet may be addressed to the unique IP address associated with the first device.

In some embodiments, the service name associated with the first IP service further includes a hostname associated with the first device. The service name associated with the first IP service may further include a subdomain associated with the hostname. The service name associated with the first IP service may further include a subnet associated with the first IP service.

In some embodiments, transmitting the IP packet to the second device includes invoking the second IP service over the SOA bus and transmitting the first IP packet to the second IP service as a parameter associated with remotely invoking the second IP service. Receiving the second IP packet from the second device may include determining that the second device has invoked the first IP service over the SOA bus and receiving the second IP packet as a parameter associated with remotely invoking the first IP service. The transmission of the first IP packet to the second device and/or the receiving of the second IP packet from the second device may occur at a virtual network interface.

In some embodiments, the first device and the second device may connect to the SOA buss using different access protocols. The SOA bus may be implemented by a plurality of devices interconnected by heterogeneous radio technologies. The SOA bus may be implemented by a peer-to-peer network.

Some embodiments may include a device for implementing IP connectivity, the device including an advertisement module, a discovery module, a transmitter, and a receiver. The advertisement module may be configured to advertise a first IP service over an SOA bus. The discovery module may be configured to discover a second IP service advertised by a second device over the SOA bus. The transmitter may be configured to transmit at least a first IP packet to the second device by remotely invoking the second IP service of the second device over the SOA bus. The receiver may be configured to receive at least a second IP packet from the second device over the SOA bus through the first advertised service.

Some embodiments may include an apparatus for implementing IP connectivity. The apparatus may include means for advertising a first IP service at a first device over a service-oriented architecture (SOA) bus, means for discovering a second IP service advertised by a second device over the SOA bus, means for transmitting at least a first IP packet to the second device by remotely invoking the second IP service of the second device over the SOA bus, and means for receiving at least a second IP packet from the second device through the first advertised service.

Some embodiments may include a computer program product configured to implement Internet Protocol (IP) connectivity, the product including a non-transitory computer-readable medium. The medium may include code to advertise a first IP service at a first device over a service-oriented architecture (SOA) bus, code to discover a second IP service advertised by a second device over the SOA bus, code to transmit at least a first IP packet to the second device by remotely invoking the second IP service of the second device over the SOA bus, and code to receive at least a second IP packet from the second device through the first advertised service.

Some embodiments may include a system for implementing IP connectivity. The system may include an SOA bus configured to communicatively coupled to a plurality of different devices using a plurality of different access technologies, a first device configured to advertise a first IP service over the SOA bus, and a second device configured to advertise a second IP service over the SOA bus. The SOA bus may enable the first device and the second device to exchange IP packets through remote invocations of the first IP service by the second device and remote service invocations of the second IP service by the first device.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The implementation of IP communications over an SOA bus is described. Devices coupled with the SOA bus may advertise and implement separate instances of an IP service. Each IP service may have an IP address in an IP subnet associated with the SOA bus. Each IP service advertised may have a name that includes a service descriptor uniformly associated with IP connectivity. Additionally, the name of each IP service may include the IP address for that particular service. A first device may transmit an IP packet to a second device over the SOA bus by remotely invoking the IP service advertised by the second device and passing the IP packet to the IP service of the second device as a parameter of invocation.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
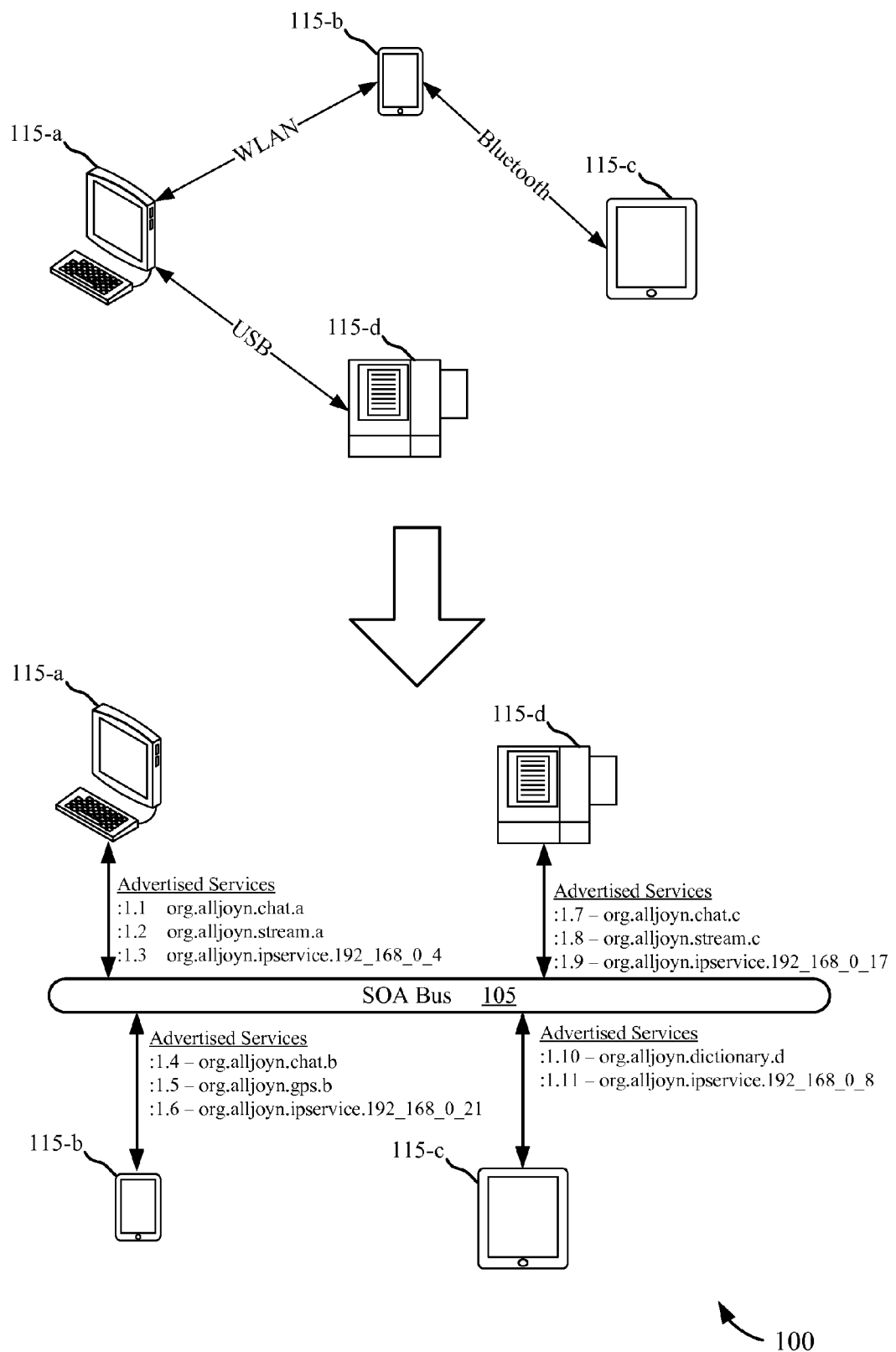
FIG. 1 shows a block diagram of an example system for implementing Internet Protocol (IP) connectivity over a Service-Oriented Architecture (SOA) bus.

FIG. 1 illustrates an example a system 100 in which various devices 115 (e.g., personal computer 115-a, smartphone 115-b, tablet computer 115-c, and printer 115-d) communicate with each other at a peer-to-peer level.

As shown in FIG. 1, the devices 115 may communicate with each other over different access technologies. In the present example, personal computer 115-a communicates with smartphone 115-b over a wireless local area network (WLAN) connection (e.g., as an ad-hoc WLAN connection and/or through a WLAN switch, access point, or router). Personal computer 115-a also communicates with printer 115-d over a Universal Serial Bus (USB) connection. Smartphone 115-b also communicates with the table computer 115-c over a Bluetooth wireless connection.

While no single device 115 of the present example is in direct communication with each of the devices 115 in the system, the devices 115 may cooperate with each other to implement an SOA bus 105 over a peer-to-peer network. As used in the present specification and appended claims, the term "SOA bus" refers broadly to any communication architecture providing a logical infrastructure for distributed nodes to advertise services to each other and remotely invoke each other's advertised services. Additionally, the term "service" refers broadly to an autonomous unit of software functionality which can be remotely invoked or called by a device or application separate from the device or application implementing the service.

Figure 2:
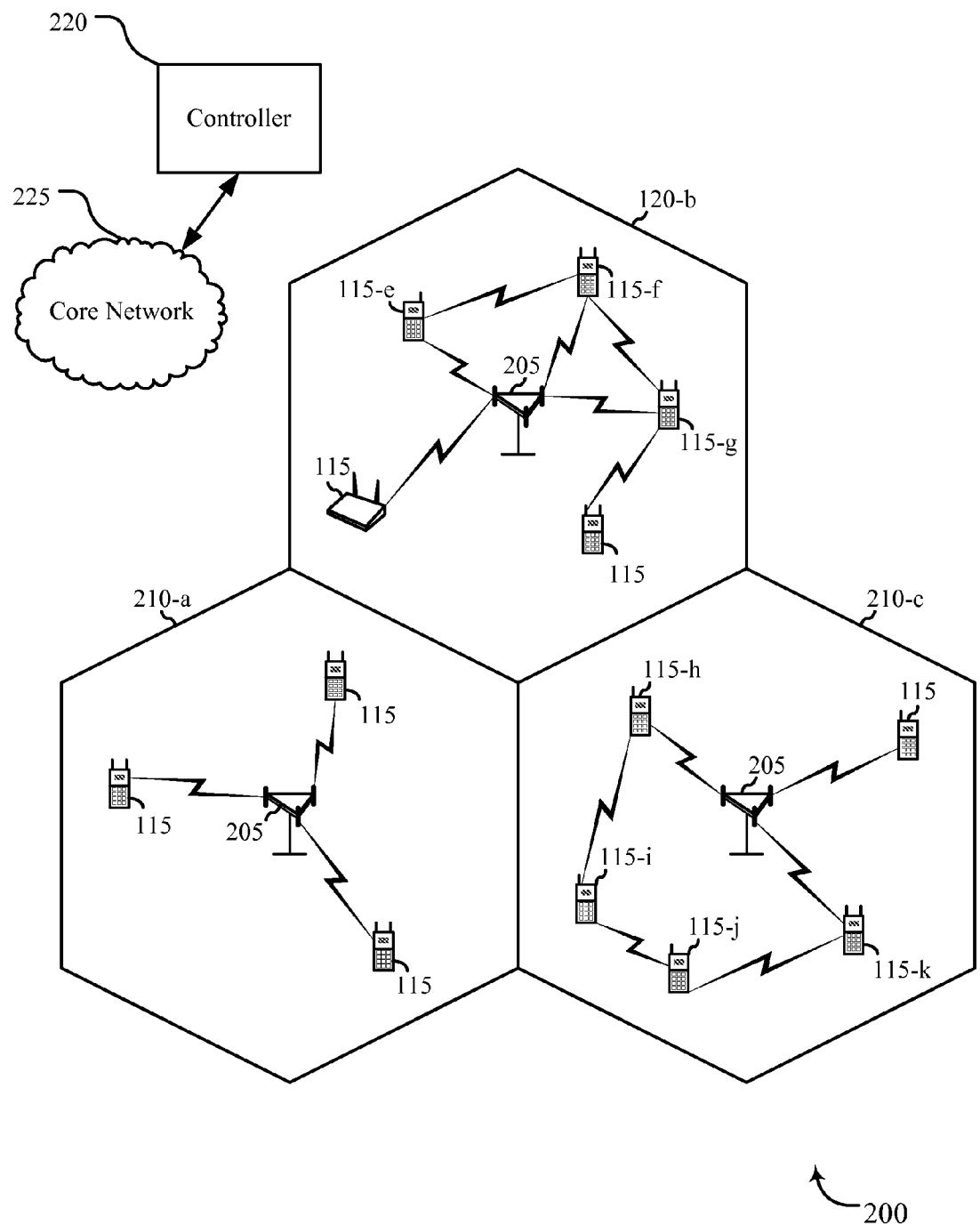
FIG. 2 shows a block diagram of a wireless communications system.

For the purposes of clarity in explanation, the description of SOA buses 105 in FIG. 2 and throughout the specification are given within the context of an AllJoyn bus implementing the open-source AllJoyn bus functionality. However, the principles of the present specification may be broadly applied to other types of SOA buses, including, but not limited to, Enterprise Service Buses (ESBs), Windows service buses, Simple Service Buses (SSBs), D-Bus, and/or other service buses.

In the system of FIG. 1, to implement the SOA bus 105, each of the devices 115 may run a separate instance of an SOA bus daemon. The SOA bus daemon running on each device 115 of the system 300 may communicate with the SOA bus daemons running on other devices 115 of the system 300 to establish a logical SOA bus 105 over the peer-to-peer network such that each of the devices 115 may communicate with any of the other devices 115 in the system 100 over the logical SOA bus 105, regardless of the access technologies used by the devices 115 to communicate with their peers.

Each of the devices 115 may be configured to provide a number of services over the SOA bus 105. For example, personal computer 115-a may provide a chat service, a streaming media service, and an Internet Protocol (IP) service. Smartphone 115-b may provide a chat service, a Global Positioning System (GPS) service, and an IP service. Tablet computer 115-c may provide a dictionary service and an IP service. Printer 115-d may provide a chat service, a streaming media service, and an IP service. Each service offered at each device 115 may be assigned a logical location or address on the SOA bus 105. For example, the chat service of personal computer 115-a is given the address of :1.1 on the SOA bus 105, the streaming media service of the personal computer 115-a is given the address of :1.2 on the SOA bus 105, and the IP service of the personal computer 115-a is given the address of :1.3 on the SOA bus 105. For the purposes of the present specification and the appended claims, the term "Internet Protocol" or "IP" refers to any version of the Internet Protocol, including IPv4, IPv6, and/or any other past or future version.

Each of the devices 115 on the SOA bus 105 may have access to a list of services advertised by other devices 115. A client process on one of the devices 115 may remotely invoke an advertised service offered by another device 115 by establishing a session on the SOA bus 105 with the address of the advertised service on the SOA bus. For instance, if a client process of smartphone 115-b desired to access the streaming media service of printer 115-d, the client process may establish a session with address :1.9 on the SOA bus 105 and remotely invoke a method or procedure associated with the streaming media service through the session. In certain examples, a client process may be another service advertised on the SOA bus. Additionally or alternatively, a client process may be an application or other unit of software functionality with a separate address on the SOA bus 105 which offers no publicly advertised services over the SOA bus 105.

As shown in FIG. 1, each of the devices 115 in the system 100 may offer an IP service over the SOA bus 105. In alternate examples, only a subset of devices 115 in a system 100 may offer an IP service over the SOA bus. The IP services may cooperate with each other to implement one or more IP subnets over the SOA bus 105. This IP subnet may be separate and independent from any other IP subnet outside of the SOA bus. Thus, even though personal computer 115-a and smartphone 115-b may be part of a first IP subnet by virtue of their WLAN connection, the first IP subnet may be separate and distinct from a second IP subnet implemented over the SOA bus 105.

As further shown in FIG. 1, each of the IP services may have a unique name that is advertised over the SOA bus 105. Each unique name may include a service descriptor uniformly associated with IP service (e.g., "org.alljoyn.ipservice") and an appended indicator of an IP address assigned to that device within the IP subnet implemented by the SOA bus 105 (e.g., "s192_168_0_4" indicating an IP address of 192.168.0.4). With the uniform service descriptor, each IP service may be quickly identified as such by other devices on the SOA bus 105. Additionally, by indicating the IP address in the name of the IP service advertised over the SOA bus 105, no additional discovery steps are necessary to determine the IP address of a device 115 in the IP subnet implemented over the SOA bus 105.

By virtue of the peer-to-peer architecture of the SOA bus 105, no separate router or switch is available (or needed) to route IP packets between devices 115 connected to the SOA bus 105. Instead, each device 115 offering an IP service on the SOA bus 105 may maintain a record of the IP address of each other known device 115 offering an IP service on the SOA bus 105. IP packets may be exchanged between devices 115 on the SOA bus 105 through the remote invocation of the advertised IP services. For example, personal computer 115-a (IP address 192.168.0.4) may transmit an IP packet addressed to 192.168.0.21 (the IP address associated with smartphone 115-b) by establishing a session between addresses :1.3 and :1.6 on the SOA bus 105, remotely invoking a method or function associated with the IP service associated with the smartphone 115-b (i.e. "org.alljoyn.ipservice.s192_168_0_21"), and passing the IP packet to the IP service associated with the smartphone 115-b over the SOA bus 105. The IP packet may be passed to the IP service associated with the smartphone 115-b as an argument or other parameter in the syntax of the remotely invoked method or function. In certain examples, the IP packet may be treated as an object rather than a packet by the IP services.

In certain examples, multiple IP subnets may be implemented over the SOA bus 105. In such examples, the IP services may enforce rules that allow for the transfer of packets only between IP addresses associated with the same IP subnet. The IP subnet of an IP service may, in some examples, be included in the name of that IP service. For example, an IP service name of "org.alljoyn.ipservice.weather.s192_168_0_21" may refer to an IP service associated with IP address 192.168.0.21 on a first subnet, whereas an IP service name of "org.alljoyn.ipservice.sports.s192_168_0_21" may refer to the same IP address on an entirely separate, independent subnet. A device 115 may have multiple IP addresses for multiple IP subnets implemented by the SOA bus 105. In this case, the device 115 may run multiple IP services, each IP service being associated with a separate subnet, and/or allow a single IP service to handle multiple subnets. If a single IP service handles multiple subnets, the name of the IP service may reflect each IP address and subnet associated with the device 115. In certain examples, multiple subnets may be discovered. For example, a user may desire to find ad hoc subnets related to weather reports. In this example, the user may search the SOA bus 105 for services with names beginning with "org.alljoyn.ipservice.weather." The user may advertise an IP address for his or her device 115 on one or more of the subnets using the same preamble with a unique IP address.

Additionally, in certain examples one or more of the IP services may include Domain Name Service (DNS) functionality. For example, an application running on personal computer 115_a may attempt to access a file from the domain hostname "magellan.ion.local". The IP service running on the personal computer 115_a may be configured to translate the provided domain into an IP service running on one of the other devices 115 connected to the SOA bus 105.

In certain examples, the name of one or more IP services may include an indicator of any domain hostnames associated with that IP service. For example, the name of an IP service advertised by a device 115 may be "org.alljoyn.ipservice.s192_168_0_21_2356_magellan". In this example, the "Magellan" component of the service name refers to the domain hostname associated with that the IP address "192.168.0.21." A predetermined domain name, such as ".ion.local" or another suffix may be appended to the hostname component of the service name (e.g., to arrive at the hostname of "magellan.ion.local"). Additionally or alternatively, the entire domain name may be included as part of the advertised service name. It is further contemplated that a service associated with a resolved hostname name may be used as a subdomain under the hostname. For example, if a service named "weather" on the SOA bus is associated with a "voyager" hostname on the SOA bus, DNS functionality on one of the devices 115 may allow for the DNS lookup of the "weather" service as "weather.voyager.ion.local."

In this way, other IP services may discover and track the domain hostnames names associated with each other IP service on the SOA bus 105 by discovering the name given to the other IP services on the SOA bus 105. This DNS functionality may allow the personal computer 115_a or another device 115 to provide effective DNS resolution to its applications and users without contacting a DNS server. Once a hostname for a neighboring service on the SOA bus is resolved to an IP address at a device 115, the hostname and resolved IP address may be added to a hosts file of the operating system of the device 115 (e.g., at "/etc/hosts" in UNIX or UNIX-like systems). In this way, any DNS query from an application to the known hostname may automatically be resolved by the operating system to the correct address on an IP subnet associated with the SOA bus. The operating system resolver of the device 115 need not be modified to accommodate hostnames associated with advertised services on the SOA bus.

It is further contemplated that in certain examples, one or more of the IP services may be configured to implement various additional routing protocols (e.g., multi-path routing) and Quality-of-Service (QoS) functionality to achieve efficient and effective IP packet routing between the IP services.

Referring back to the example of the service named "org.alljoyn.ipservice.s192_168_0_21_2356_magellan", the "2356" in the advertised service name corresponds to a unique ID generated by the device 115 to distinguish between different devices 115 advertising the same service. Thus, IP address conflicts between advertised services may be detected by determining if another service or device with the same IP address has the same or a different unique ID. If the IP address has the same unique ID, no conflict exists. Otherwise, an IP address conflict to be resolved may be detected.

Referring next to FIG. 2, a block diagram illustrates one example of a wireless communications system 200 in which IP service may be implemented over an SOA bus as described above in FIG. 1. The system 200 includes base stations 205 (or cells), devices 115, a base station controller 220, and a core network 225 (the controller 220 may be integrated into the core network 225). The system 200 may support operation on multiple carriers (waveform signals of different frequencies).

In the example of FIG. 2, various devices 115 may communicate with the core network 225 through one or more base stations 205. Additionally, certain devices 115 may establish peer-to-peer communications with each other. A group of such devices 115 may cooperate with each other to establish a peer-to-peer network. For example, device 115-e, device 115-f, and device 115-g may leverage a peer-to-peer connection between device 115-e and device 115-f and the peer-to-peer connection between device 115-f and device 115-g to establish a peer-to-peer network between the three devices 115.

The devices 115 may further cooperate to implement an SOA bus (e.g., SOA bus 105 of FIG. 1) over the peer-to-peer network, and implement IP communications over the SOA bus, as described above with respect to FIG. 1. In this way, an independent IP subnet may be established among devices 115-e, 115-f without reliance on base station 205 or core network 225. However, in certain examples, one or more of the devices 115 may advertise a service over the SOA bus which makes use of a connection to the core network 225 through a base station 205. For example, device 115-e may download a file from the core network 225 and stream the file to device 115-g over the IP subnet implemented over the SOA bus between device 115-e, device 115-f, and device 115-g.

A device need not be in communication with a base station 205 to join a peer-to-peer network that provides IP services over an SOA bus. As shown in FIG. 2, device 115-i and device 115-j may each implement peer-to-peer connections with other devices 115 without communicating with a base station 205. Using these peer-to-peer connections, an SOA bus may be implemented among device 115-h, device 115-i, device 115-j, and device 115-k. As described above, the SOA bus may be used to implement a private IP subnet among the four devices 115 connected to the SOA bus.

The base stations 205 may wirelessly communicate with the devices 115 via a base station antenna (not shown). The base stations 205 may communicate with the devices 115 under the control of the base station controller 220 via multiple carriers. Each of the base station 205 sites may provide communication coverage for a respective geographic area. The coverage area for each base station 205 here is identified as 210-a, 210-b, or 210-c. The coverage area for a base station may be divided into sectors (not shown, but making up only a portion of the coverage area). The system 200 may include base stations 205 of different types (e.g., macro, micro, and/or pico base stations). There may be overlapping coverage areas for different technologies.

The devices 115 may be dispersed throughout the coverage areas 210. The devices 115 may be referred to as mobile stations, mobile devices, access terminals (ATs), user equipments (UEs), subscriber stations (SSs), subscriber units, in addition to stationary devices. The devices 115 may include, but are not limited to, cellular phones and wireless communications devices, but may also include desktop computers, printers, servers, set-top boxes, televisions and other media players, personal digital assistants (PDAs), other handheld devices, netbooks, notebook computers, etc. In some examples, certain of the devices may be As shown in FIG. 1, certain devices 115 may not directly communicate with a base station. For example, in cell 210-c, various devices 115 are shown which do not have an established wireless connection to the base station 205. As further shown in FIG. 1, certain devices 115 may communicate directly with each other without routing messages through a base station 205. By communicating with each other, either directly or indirectly, the devices may cooperate to establish a service-oriented architecture (SOA) bus, in which devices 115 are able to advertise software services to other devices on the bus, and discover and invoke each other's services over the bus. In certain examples, communications between devices 115 over the implemented SOA bus may occur independent of the base stations 205 or their associated core network 225. Alternatively, one or more communications over the SOA bus may occur through a base station 205.

Figure 3:
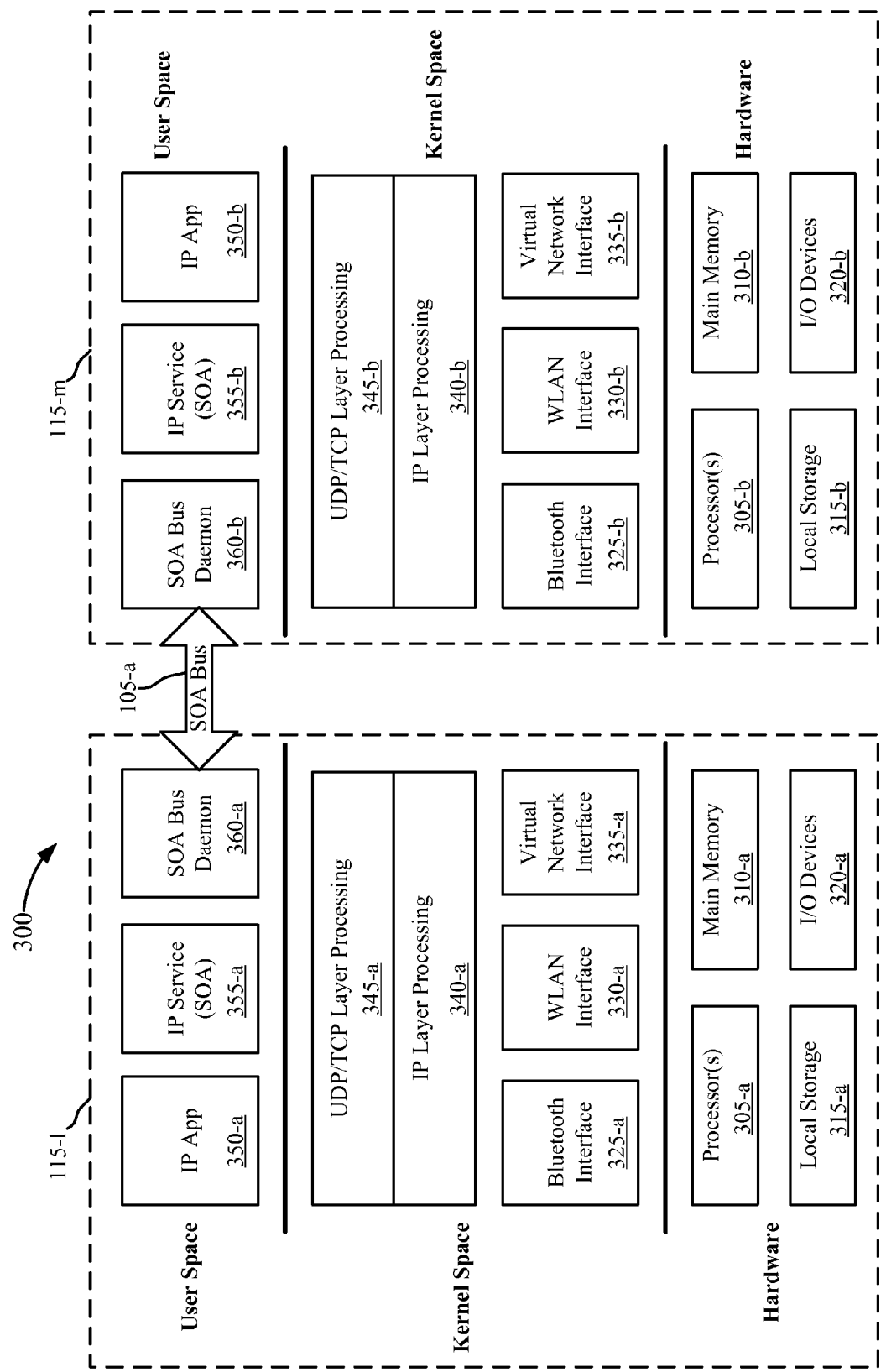
FIG. 3 shows a block diagram of an example system for implementing IP connectivity over an SOA bus.

FIG. 3 is a block diagram of an example system 300 for implementing IP connectivity over an SOA bus. The system 300 includes a first device 115-1 and a second device 115-m. The first device 115-1 and the second device 115-m communicate with each other over a logical SOA bus 105-a. The first device 115-1 and the second device 115-m may be examples of the devices 115 described above with reference to FIG. 1 or FIG. 2. The SOA bus 105-a may be an example of the SOA bus 105 described above with reference to FIG. 1.

Each device 115 of the present example includes a hardware platform of one or more processors 305, main memory 310, local storage 315, and one or more input/output (I/O) devices 320. The processor(s) 305 of each device 115 may execute code loaded into the main memory 310 from local storage 315 to execute various units of functionality in kernel space and user space of an operating system.

In kernel space, each device 115 shown in the example of FIG. 3 includes a Bluetooth interface 325 for sending and receiving Bluetooth communications, a WLAN interface 330 for sending and receiving WLAN communications, and a virtual network interface 335. The virtual network interface may route packets between the IP layer processing 340 in the network stack and an IP service 355 executing in user space to implement IP communications over an SOA bus 105-a. In certain examples, the virtual network interface 335 may implement a TUN/TAP program or module according to known specifications. The virtual network interface 335 may simulate a network layer device. The IP layer processing 340 and UDP/TCP layer processing 345 may perform the traditional functions associated with packet processing in layer 3 and layer 4 of a network stack.

In user space, each device 115 shown in the example of FIG. 3 includes an IP application 350 configured to transmit and receive data over an IP network, an IP service 355 configured to implement IP connectivity over the SOA bus 105-a, and an SOA bus daemon 360 configured to implement the SOA bus 105-a. The IP service 355 and the SOA bus daemon 360 may be examples of the IP services and SOA bus daemons described above with reference to the SOA bus 105 of FIG. 1.

To illustrate IP communications between the devices 115 over the SOA bus 105-a, consider the example of the IP application 350-a of the first device 115-1 transmitting an IP packet to the second device 115-m. In this example, IP application 350-a generates data which is assembled into an IP application by the UDP/TCP layer processing 345-a and the IP layer processing 340-a. The assembled IP packet may have as the destination address an IP address associated with the IP service 355-b of the second device 155-f As described above with reference to FIG. 2, the IP address associated with the IP service 355-b of the second device 155-f may be determined by the IP Service 355-a of the first device 115-1 based on an advertised name of the IP service 355-b of the second device 155-f.

The virtual network interface 335-a may receive or intercept the constructed IP packet and forward the IP packet to the IP service 335-a of the first device. The IP service 355-a of the first device may then remotely invoke a method or procedure associated with the IP service 355-b of the second device 115-m to pass the IP packet to the IP service 355-b of the second device 115-m over the SOA bus 105-a. For example, the IP packet may be passed to the IP service 355-b of the second device 115-m as an argument or other parameter associated with the syntax of the invoked method or procedure. The IP packet may be treated by the IP services 355 as a software object rather than a packet.

The IP packet received at the IP service 355-b of the second device 115-m is then forwarded to the virtual network interface 335-b of the second device, which places the IP packet into the IP layer processing 340-b and UDP/TCP layer processing 345-b of the network stack. Once UDP/TCP layer processing 345 has completed on the IP packet, the data from the IP packet may be provided to the IP application 350-b of the second device 115-m.

Figure 4:
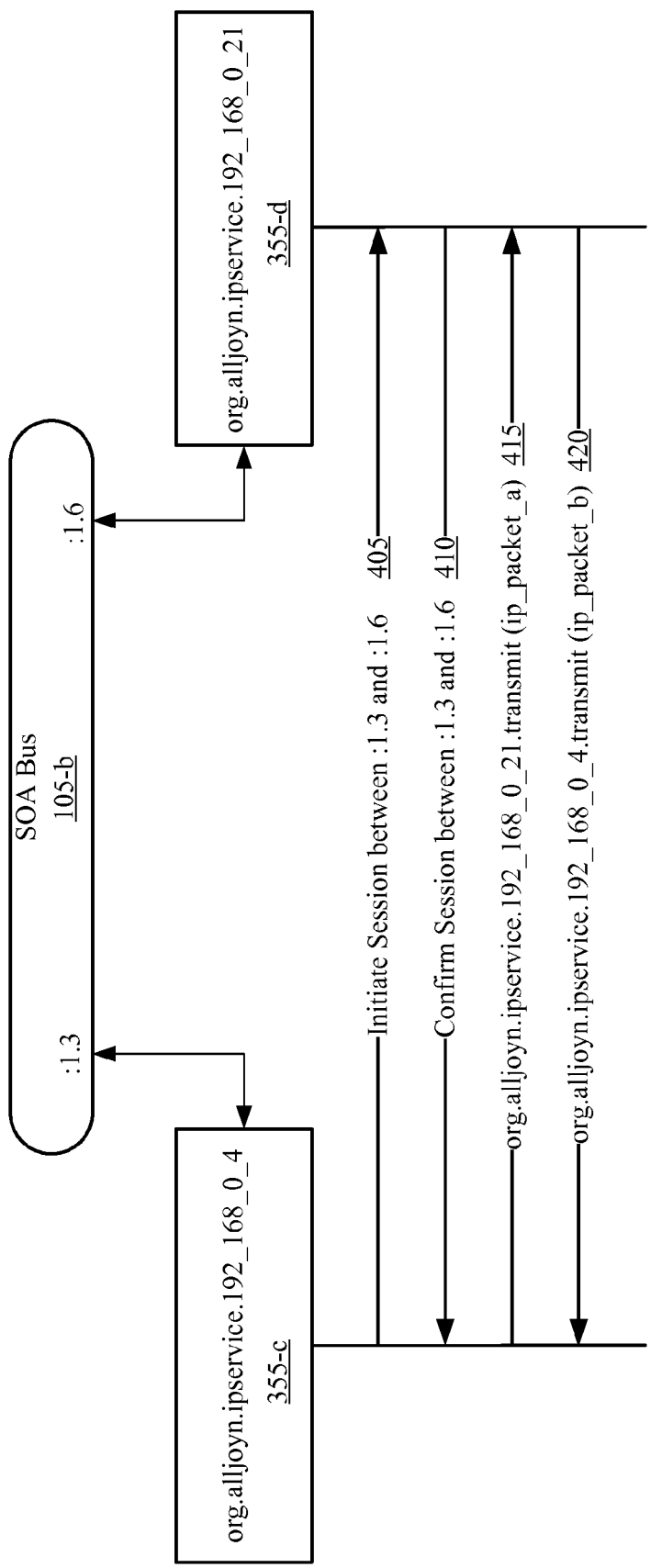
FIG. 4 shows a block diagram of example communication signals between a first IP service of a first device and a second IP service of a second device over an SOA bus.

FIG. 4 is a block diagram of example communication signals over an SOA bus 105-b between a first IP service 355-c implemented by a first device and a second IP service 355-d implemented by a second device. The IP services 355 may be examples of the IP service 355 described above with reference to FIG. 3. The first and second device may be examples of a device 115 described above with reference to FIG. 1, FIG. 2, or FIG. 3. The SOA bus 105-b may be an example of the SOA bus 105 described above with reference to FIG. 1 or FIG. 3.

Each of the IP services 355 may have a unique address on the SOA bus 105-b. In the present example, the first IP service 355-c has an address of :1.3 on the SOA bus 105-b, and the second IP service 355-d has an address of :1.6 on the SOA bus 105-b. Additionally, each IP service 355 has a name that is advertised on the SOA bus and discoverable to other services. The name of each IP service 355 of the present example includes a service descriptor (i.e., "org.alljoyn.ipservice") uniformly associated with IP services 355 in a contiguous namespace of the SOA bus 105-b. Each name additionally has an indicator of an IP address associated with an IP subnet implemented over the SOA bus 105-b. Thus, the first IP service 355-c has a name of "org.alljoyn.ipservice.s192_168_0_4," indicating an IP service 355 with an IP address of 192.168.0.4, and the second IP service 355-d has a name of "org.alljoyn.ipservice.s192_168_0_21," indicating an IP service 355 with an IP address of 192.168.0.21.

For the first and second IP services 355 to exchange IP packets, the first IP service 355-c first initiates 405 a session between :1.3 and :1.6 on the SOA bus 105-b. The second IP service 355-d confirms 410 the session between :1.3 and :1.6. The first IP service 355-c may then transmit a first IP packet addressed to the IP address of the second IP service 355-d by remotely invoking 415 a method named "org.alljoyn.ipservice.s192_168_0_21.transmit" at the second IP service 355-d over the SOA bus 105-b. The first IP service passes the first IP packet to the invoked method as an argument or other parameter for the function. The function may be one of a known set of functions implemented by all IP services to implement IP communication. The IP packet may be treated as an object parameter between the two IP services 355. The second IP service 355-d may send the first IP service 355-c a second packet by remotely invoking 420 a method named "org.alljoyn.ipservice.s192_168_0_4.transmit" at the first IP service 355-c over the SOA bus 105-b, passing the second IP packet to the method as an argument or other parameter to the invoked method.

Figure 5:
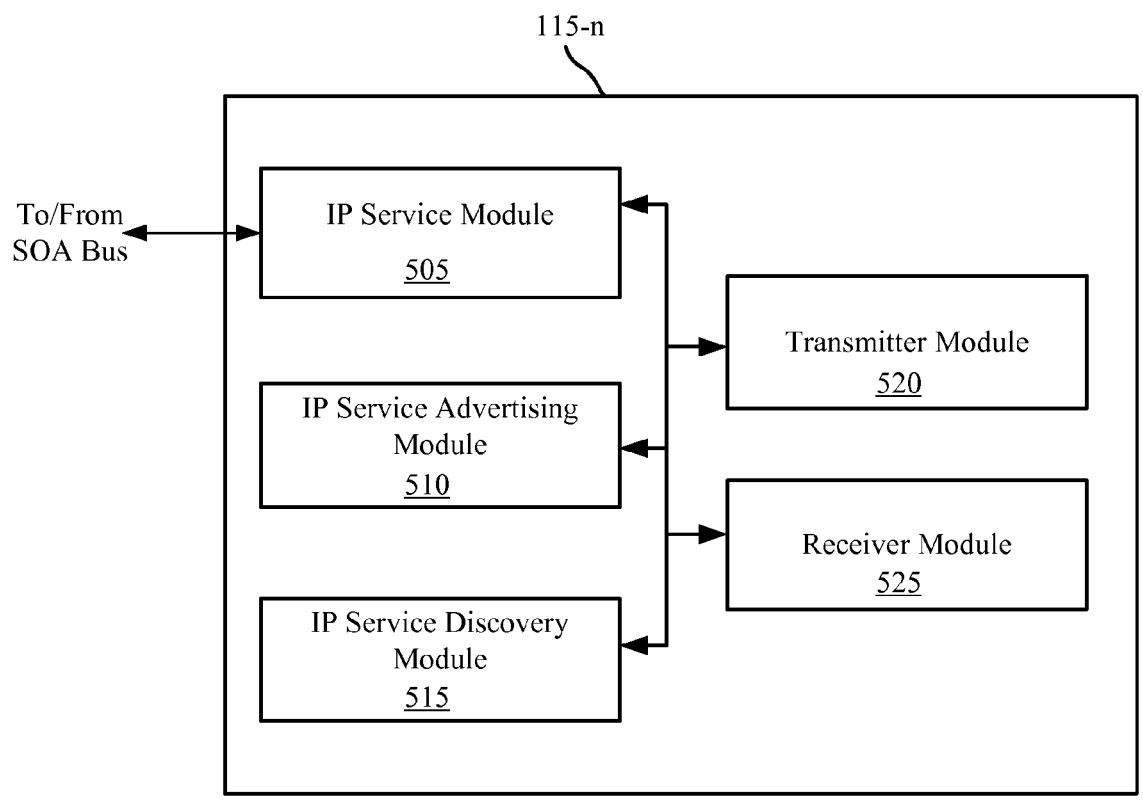
FIG. 5 shows a block diagram of an example device configured to transmit and receive IP packets over an SOA bus.

FIG. 5 illustrates a block diagram of an example device 115-n. The device 115-n may be an example of the devices 115 described above with reference to FIG. 1, FIG. 2, or FIG. 3. The device 115-n may be implemented, for example, entirely in hardware, or as a combination of hardware and software. The device 115-n includes an IP service module 505, an IP service advertising module 510, an IP service discovery module 515, a transmitter module 520, and a receiver module 525.

The IP service module 505 may be configured to implement an IP service (e.g., IP service 355 of FIG. 3 or FIG. 4) over an SOA bus implemented by a peer-to-peer network (e.g., SOA bus 105 of FIG. 1, FIG. 3, or FIG. 4). The IP service implemented by the IP service module 505 may be associated with an IP address within an IP subnet implemented over the SOA bus. The IP service may be configured to communicate with other IP services associated with different IP addresses in the subnet over the SOA bus.

The IP service advertising module 510 may advertise the IP service implemented by the IP service module 505 over the SOA bus to other devices and services. The IP service advertising module 510 may advertise the name of the IP service, the IP address associated with the IP service, a Media Access Control (MAC) address, a globally unique identifier (GUID), a universally unique identifier (UUID), and/or any other information about the IP service that may suit a particular implementation of these principles. In certain examples, the IP service advertising module 510 may also advertise subnet and/or DNS resolution data associated with the first IP service.

The IP service discovery module 515 may discover a second IP service advertised by a second device over the SOA bus. As described in more detail elsewhere in this description, the second IP service may be discovered based on a uniform IP service descriptor contained in an advertised name of the second IP service. The IP service discovery module 515 may also discover an IP address associated with the second IP service from the advertised name, or by some other method. In certain examples, the IP discovery module 515 may also discover a MAC address, a GUID, a UUID, and/or any other information about the second IP service that may suit a particular implementation of these principles. In additional or alternative examples, the IP service discovery module subnet and/or DNS resolution data associated with the second IP service.

The transmitter module 520 may be configured to transmit at least a first IP packet to the second device by causing the IP service module 505 to remotely invoke the second IP service over the SOA bus, passing the first IP packet to the second IP service as an argument or other parameter associated with invoking the second IP service.

The receiver module 525 may be configured to receive at least a second IP packet from the second device over the SOA bus through the IP service implemented by the IP service module 505 of the device 115-*n*. The second device may transmit the second IP packet to the IP service by remotely invoking the IP service over the SOA bus and passing the second IP packet to the IP service as an argument or parameter associated with invoking the IP service.

Figure 6:
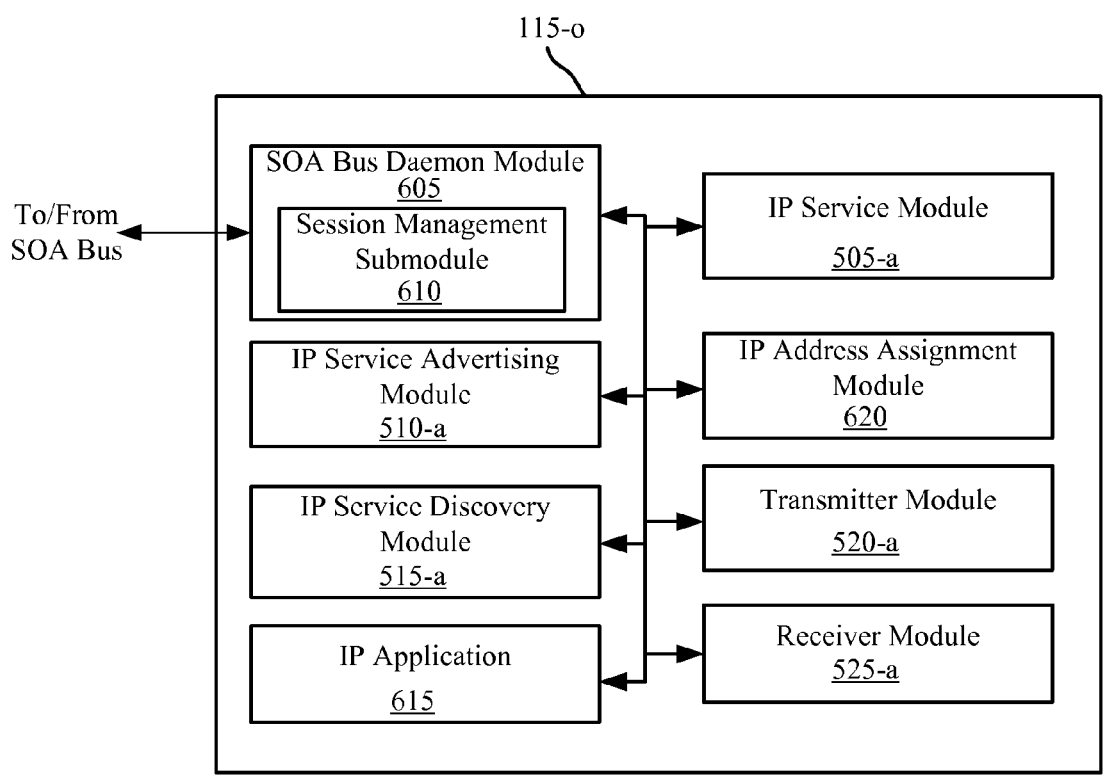
FIG. 6 shows a block diagram of an example device configured to transmit and receive IP packets over an SOA bus.

FIG. 6 illustrates a block diagram of an example device 115-*o*. The device 115-*o* may be an example of the devices 115 described above with reference to FIG. 1, FIG. 2, FIG. 3, or FIG. 5. The device 115-*o* may be implemented, for example, entirely in hardware, or as a combination of hardware and software. Similar to the device 115-*n* of FIG. 5, the device 115-*o* of FIG. 6 includes an IP service module 505-*a*, an IP service advertising module 510-*a*, an IP service discovery module 515-*a*, a transmitter module 520-*a*, and a receiver module 525-*a*. Additionally, the device 115-*o* of FIG. 6 includes an SOA bus daemon module 605, an IP application 615, and an IP address assignment module 620.

The SOA bus daemon module 605 may implement an SOA bus daemon that establishes peer-to-peer connections with neighboring devices. In this way, multiple devices may establish a peer-to-peer network that implements an SOA bus, as described above. Because the SOA bus daemon module 605 logically implements the SOA bus functionality on the device 115-*o*, the IP service module 505-*a* may communicate with the SOA bus through the SOA bus daemon module 605. The SOA bus daemon module 605 may include a session management submodule 610 configured to establish, maintain, and terminate sessions with services offered on the SOA bus.

The IP application 615 may include an application executed in user space that produces and receives data sent over an IP subnet implemented over the SOA bus. Thus, data in IP packets sent by the transmitter module 520-*a* may originate from the IP application 615, and data in IP packets received by the receiver module 525-*a* may ultimately be forwarded to the IP application 615.

The IP address assignment module 620 may be configured to generate the IP address associated with the IP service module 505-*a*. As described above with respect to previous Figures, the IP address assignment module 620 may randomly generate an IP address within a permissible range associated with the IP subnet of the SOA bus, check the SOA bus for conflicts, and assign the IP address to the IP service module 505-*a* if no conflicts are found.

Figure 7:
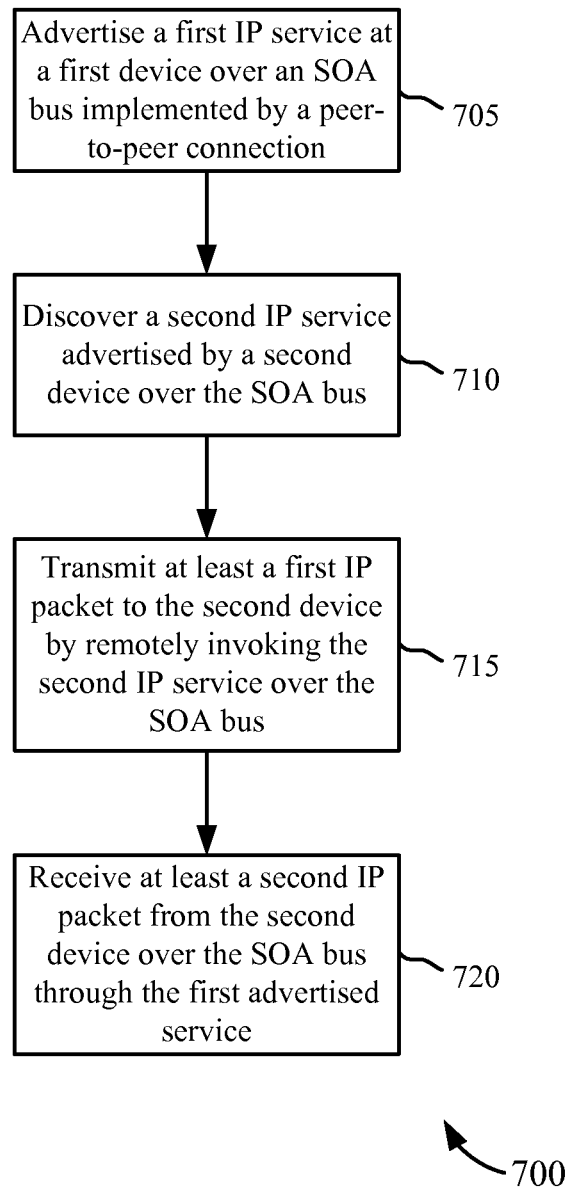
FIG. 7 shows a flowchart of an example method for implementing IP connectivity over an SOA bus.

FIG. 7 illustrates an example of a method 700 of enabling IP connectivity over an SOA bus implemented by a peer-to-peer network, according to the principles of the present disclosure. The method 700 of FIG. 7 may be performed, for example, by one or more of the devices 115 described above with reference to FIGS. 1-6.

At block 705, a first IP service at a first device is advertised over an SOA bus implemented by a peer-to-peer network. As described above, the SOA bus may include an ALLJOYN service bus, an Enterprise Service Bus (ESB), a MICROSOFT WINDOWS Service Bus, a Simple Service Bus (SSB), and/or any other applicable type of service bus. The first IP service may be advertised using a service name associated with the first IP service, the service name associated with the first service including a service descriptor (e.g., "org.alljoyn.ipservice") uniformly associated with IP service at the SOA bus.

At block 710, a second IP service advertised by a second device over the SOA bus is discovered. The second IP service may be discovered based a service name associated with the second IP service. The service name associated with the second IP service may include the same service descriptor for IP service as the service name associated with the first IP service. Each of the IP service names may also include an indication of a unique IP address associated with the respective device implementing the IP service within an IP subnet implemented by the SOA bus. The service names for the first IP service and the second IP service may also be implemented within a contiguous namespace implemented by the SOA bus.

At block 715, the first device transmits at least a first IP packet to the second device by remotely invoking the second IP service over the SOA bus. For example, the first device may remotely call a function associated with the second IP service over the SOA bus, passing the first IP packet to the second IP service as an argument or parameter of the function. The first IP packet may be addressed to the unique IP address associated with the second device within the IP subnet implemented by the SOA bus.

At block 720, the first device receives at least a second IP packet from the second device over the SOA bus through the first advertised service. For example, the second device may remotely call a function associated with the first IP service over the SOA bus, passing the second IP packet to the first IP service as an argument or parameter of the function. The second IP packet may be addressed to the unique IP address associated with the first device within the IP subnet implemented by the SOA bus.

Figure 8:
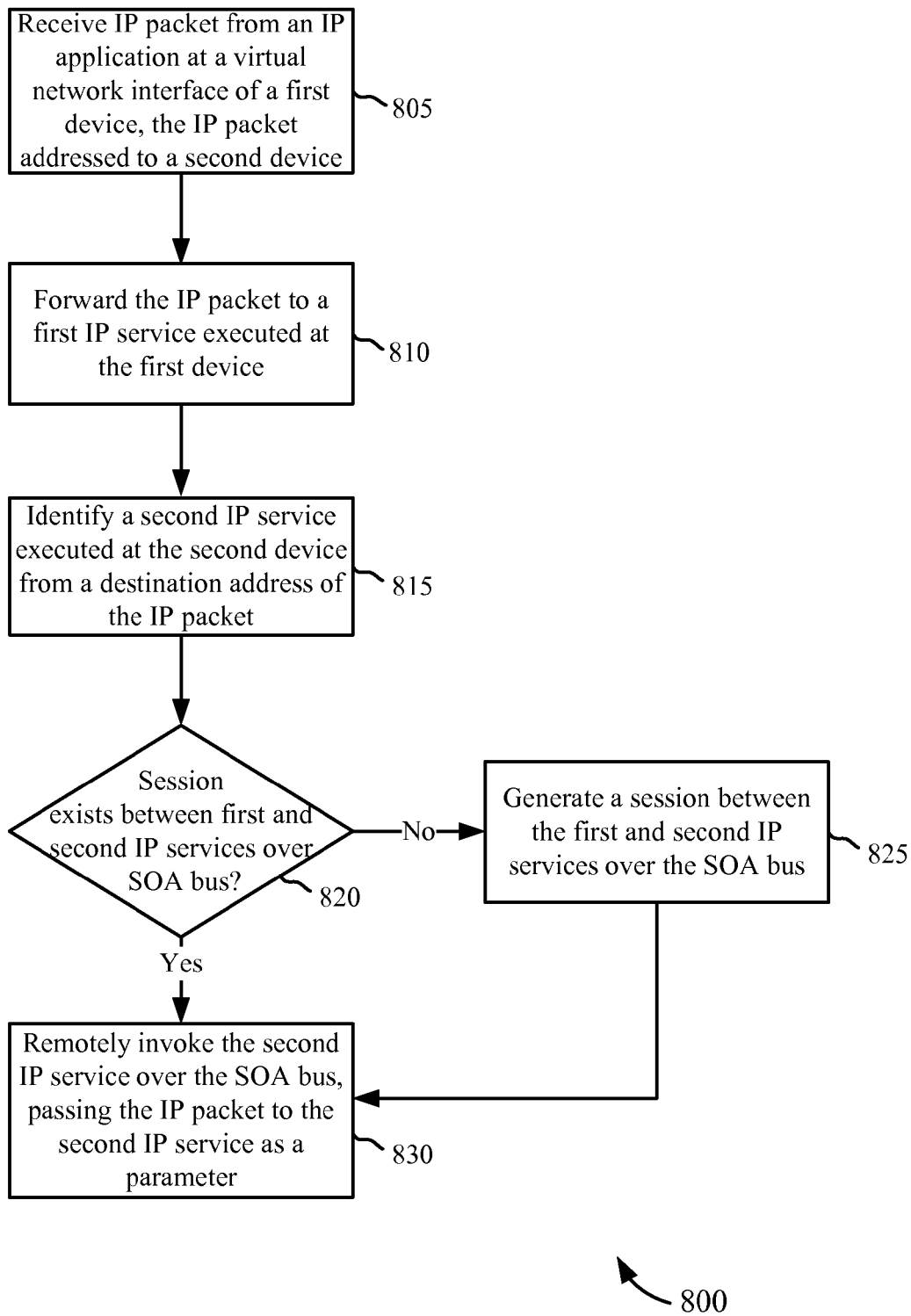
FIG. 8 shows a flowchart of an example method for implementing IP connectivity over an SOA bus.

FIG. 8 is a flowchart illustrating another example of a method 800 of enabling IP connectivity over an SOA bus implemented by a peer-to-peer network, according to the principles of the present disclosure. The method 800 of FIG. 8 may be performed, for example, by one or more of the devices 115 described above with reference to FIGS. 1-6.

At block 805, an IP packet is received from an IP application at a virtual network interface of a first device, the IP packet being addressed to the second device. The virtual network interface may receive IP packets addressed to IP addresses associated with an IP subnet implemented by an SOA bus. In certain examples, IP packets addressed to an IP address on the SOA bus may be forwarded directly to the virtual network interface from IP applications. Additionally or alternatively, the virtual network interface may intercept IP packets addressed to IP addresses on the SOA bus.

At block 810, the IP packet received at the virtual network interface is forwarded to a first IP service executed at the first device. The first IP service may be a service advertised on the SOA bus to other devices. The first IP service may be configured to transmit and receive IP packets as objects of remote function or procedure calls made over the SOA bus.

At block 815, a second IP service executed at the second device may be identified from a destination address of the IP packet. For example, the second IP service may have a name, advertised on the SOA bus, which includes the IP address associated with the second IP service. Thus, the second IP service may be identified by searching a list of names of services advertised over the SOA bus for an IP service which includes the destination IP address of the IP packet.

At block 820, a determination is made as to whether a session currently exists between the first and second IP services over the SOA bus. This determination may be made using one or more tables or other data structures which track the progress of sessions between the services or applications of the first device and services or applications of external devices over the SOA bus.

If a service does not currently exist between the first and second IP services over the SOA bus (block 820, No), a new session is generated between the first and second IP services over the SOA bus at block 825. When a session exists between the first and second IP services over the SOA bus, the first IP service may remotely invoke the second IP service over the SOA bus at block 830, passing the IP packet to the second IP service as a parameter or argument of a function or procedure of the second IP service. In certain examples, the first and second IP services may treat the IP packet as an object rather than a routable packet.

Figure 9:
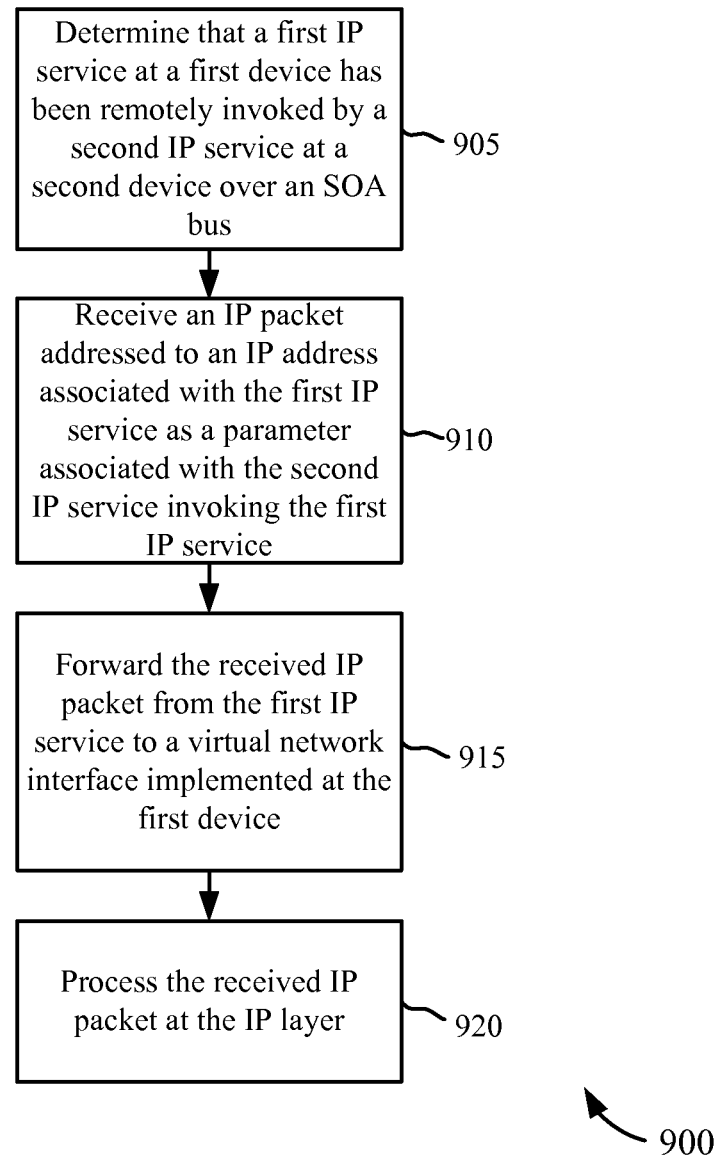
FIG. 9 shows a flowchart of an example method for implementing IP connectivity over an SOA bus.

FIG. 9 illustrates another example of a method 900 of enabling IP connectivity over an SOA bus implemented by a peer-to-peer network, according to the principles of the present disclosure. The method 900 of FIG. 9 may be performed, for example, by one or more of the devices 115 described above with reference to FIGS. 1-6.

At block 905, a determination is made that a first IP service at a first device has been remotely invoked by a second IP service at a second device over an SOA bus. For example, it may be determined at the first device that the second IP service has remotely called a function associated with the first IP service over the SOA bus.

At block 910, an IP packet addressed to an IP address associated with the first IP service is received as a parameter associated with invoking the first IP service. For example, the first IP service may receive the IP packet as an object parameter or argument within the syntax of function remotely called by the second IP service.

At block 915, the received IP packet is forwarded from the first IP service to a virtual network interface implemented at the first device. The virtual network interface may treat the IP packet as if the IP packet had been received as a conventional packet over a conventional network connection. At block 920, the virtual network interface may initiate processing of the received IP packet at the IP layer. In certain examples, a TCP or UDP datagram may be extracted from the IP packet during IP layer processing. Data from the TCP or UDP datagram may be forwarded to the application layer based on the results of TCP or UDP processing. Additionally or alternatively, data from the TCP or UDP datagram may be used to update the status of a TCP or UDP socket.

Figure 10:
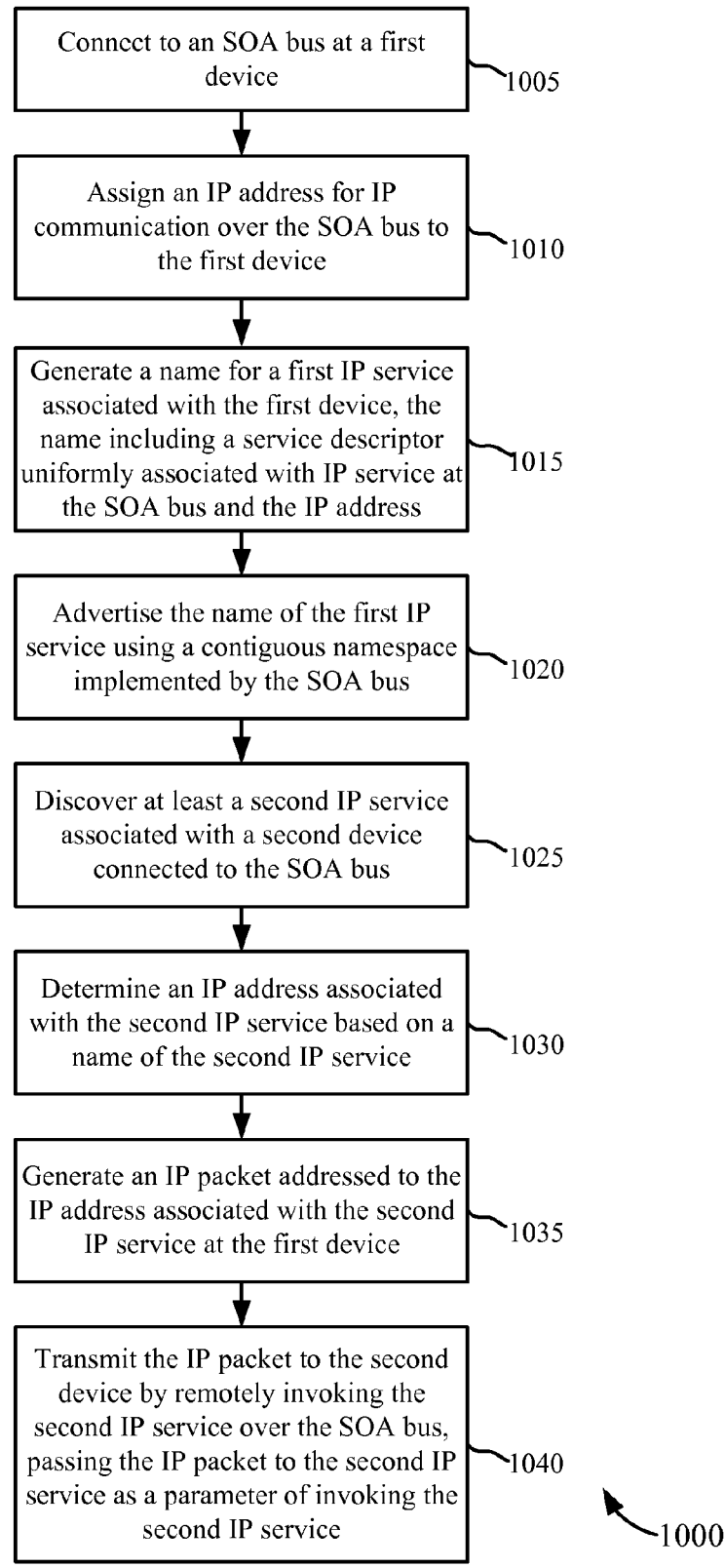
FIG. 10 shows a flowchart of an example method for implementing IP connectivity over an SOA bus.

FIG. 10 is a flowchart illustrating another example of a method 1000 of enabling IP connectivity over an SOA bus implemented by a peer-to-peer network, according to the principles of the present disclosure. The method 1000 of FIG. 10 may be performed, for example, by one or more of the devices 115 described above with reference to FIGS. 1-6.

At block 1005, a first device connects to an SOA bus. The SOA bus may include, for example, an ALLJOYN service bus, an ESB, a MICROSOFT WINDOWS service bus, an SSB, and/or any other suitable SOA bus.

At block 1010, an IP address for IP communication is assigned to the first device. The IP address may be assigned to the first device by randomly generating an IP address within a subnet implemented by the SOA bus, and checking for IP address conflicts on the SOA bus.

At block 1015, a name for a first IP service associated with the first device is generated. The name may include a service descriptor uniformly associated with IP service at the SOA bus and the assigned IP address. For example, if the service descriptor uniformly associated with IP service is "org.alljoyn.ipservice", and the IP address assigned to the first device for IP communication over the SOA is 192.168.0.4, the name for the first IP service may be generated by appending the assigned IP address to the service descriptor to create the name of "org.alljoyn.ipservice.s192_168_0_4" for the first IP service.

At block 1020, the first device advertises the name of the first IP service using a contiguous namespace implemented by the SOA bus. For example, an SOA bus daemon running on the first device may broadcast the name of the first IP service to other SOA bus daemons running on other devices connected to the SOA bus.

At block 1025, a second IP service associated with a second device connected to the SOA bus may be discovered. For example, the SOA bus daemon running on the first device may receive a broadcast from an SOA bus daemon running on the second device which includes the name of the second IP service. The SOA bus daemon running on the first device may determine from the name of the second IP service that the second IP service is for IP communications, and forward the name of the second IP service to the first IP service.

At block 1030, an IP address associated with the second IP service is determined based on the name of the second IP service. For example, if the name of the second IP service is "org.alljoyn.ipservice.s192_168_0_22", the first IP service may determine the IP address associated with the second IP service to be 192.168.0.22.

At block 1035, an IP packet addressed to the IP address associated with the second IP service is generated at the first device. The IP packet may be generated by an IP application at the first device.

At block 1040, the IP packet is transmitted to the second device by remotely invoking the second IP service over the SOA bus and passing the IP packet to the second IP service as a parameter of invoking the second IP service. In certain examples, the IP packet may be an object associated with the syntax of a procedure or other function associated with the second IP service and remotely called by the first IP service.

Figure 11:
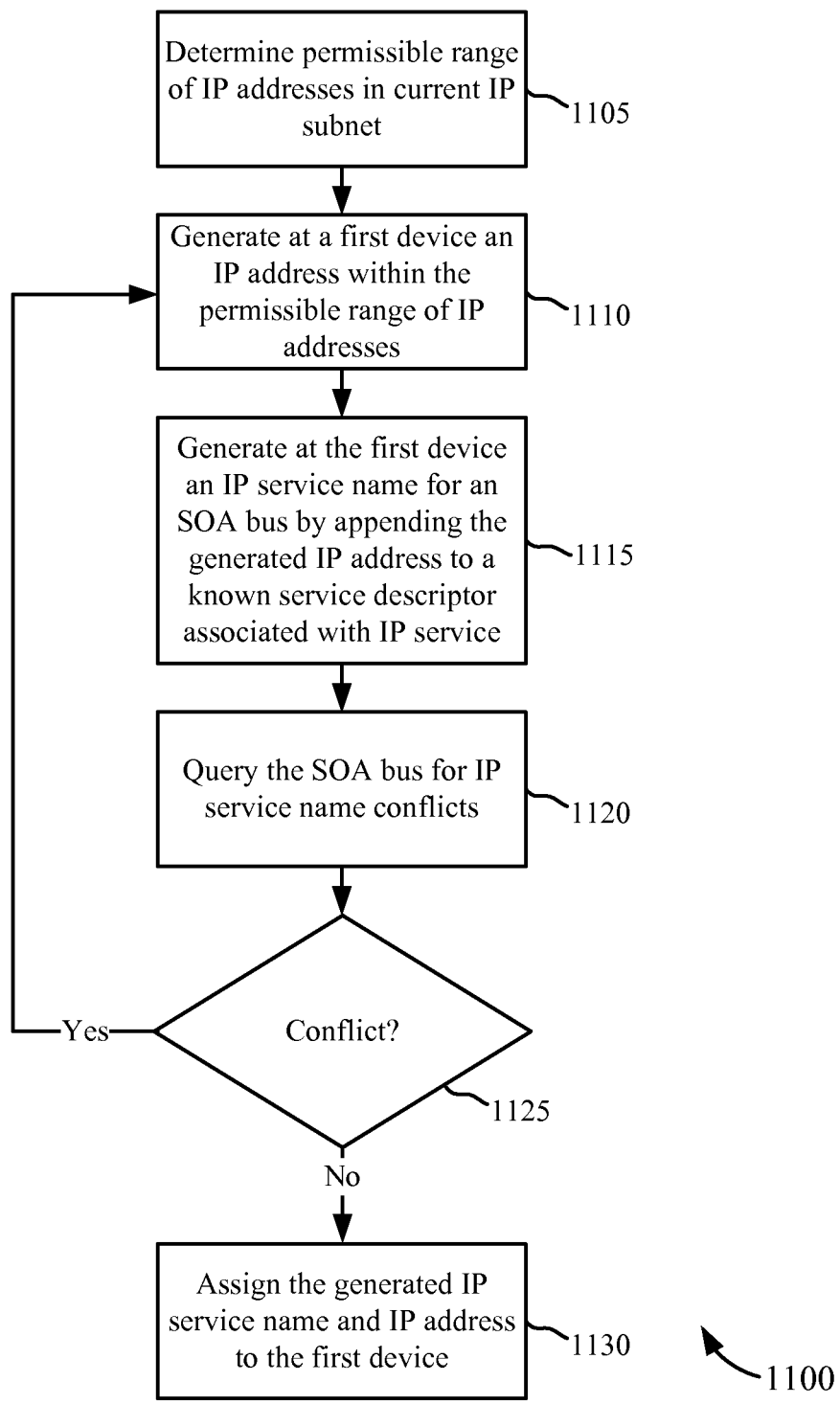
FIG. 11 shows a flowchart of an example method for generating an IP address for use in IP communications over an SOA bus.

FIG. 11 is a flowchart illustrating an example of a method 1100 of generating an IP address for use in IP communications over an SOA bus, according to the principles of the present disclosure. The method 1100 of FIG. 11 may be performed, for example, by one or more of the devices 115 described above with reference to FIGS. 1-6.

At block 1105, a permissible range of IP addresses in a current IP subnet implemented by the SOA bus is determined. In certain examples, one or more applications connected to the SOA bus may advertise the permissible range of IP addresses. Additionally or alternatively, the permissible range of IP addresses may be deterministically identified based on properties of the SOA bus.

At block 1110, an IP address within the permissible range of IP addresses for the subnet is generated at a first device. In certain examples, the IP address may be generated using a random generator and a mask that keeps the generated IP address within the permissible range for the subnet.

At block 1115, an IP service name is generated for the first device for use on the SOA bus. The IP service name is generated by appending the generated IP address to a known service descriptor associated with IP service on the SOA bus. The generated IP service name may comply with the syntax of a contiguous namespace implemented by the SOA bus.

At block 1120, the SOA bus is queried for IP service name conflicts. For example, the generated IP service name may be transmitted from an SOA bus daemon running on the first device to SOA bus daemons running on other devices connected to the SOA bus. If another device connected to the SOA bus is already using the IP service name generated for the first device (block 1125, Yes), flow returns to block 1110, where a new IP address is generated at the first device. Otherwise (block 1125, No), the IP service name and IP address generated at the first device are assigned to the first device at block 1130.

Figure 12:
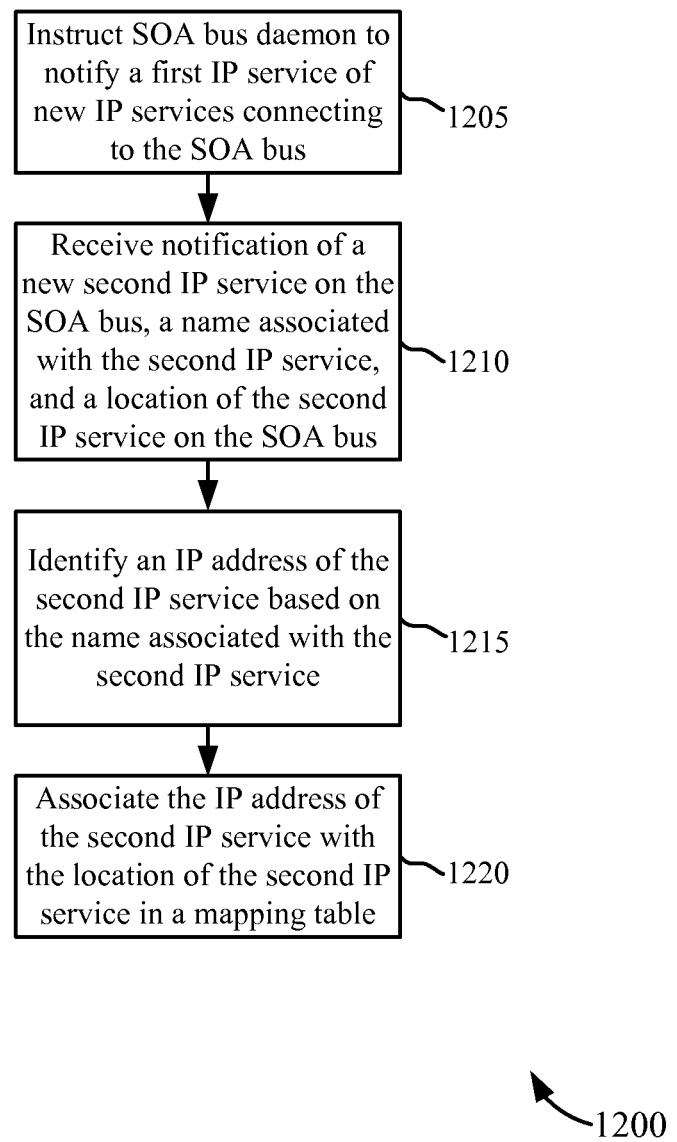
FIG. 12 shows a flowchart of an example method for discovering IP services for implementing IP connectivity over an SOA bus.

FIG. 12 is a flowchart illustrating an example of a method 1200 of discovering IP services on an SOA bus, according to the principles of the present disclosure. The method 1200 of FIG. 12 may be performed, for example, by one or more of the devices 115 described above with reference to FIGS. 1-6.

At block 1205, an SOA bus daemon running on a device connected to the SOA bus receives the instruction to notify a first IP service running on the device of new IP services connecting to the SOA bus. In certain examples, an express instruction from the first IP service may be received at the SOA bus daemon. Additionally or alternatively, the instruction may be inherently provided to the SOA bus daemon as part of the underlying code of the SOA bus daemon.

At block 1210, the first IP service receives notification of a new second IP service on the SOA bus. The first IP service receives a name of the second IP service and a location or address of the second IP service on the SOA bus.

At block 1215, an IP address of the second IP service is identified based on the name associated with the second IP service. The IP address of the second IP service may be different from the location or address of the second IP service on the SOA bus. For example, the IP address of the second IP service may be "192.168.0.12", and the location of the second IP service on the SOA bus may be ":1.3".

At block 1220, the IP address of the second IP service is associated with the location of the second IP service on the SOA bus in a mapping table or other data structure maintained by the first IP service.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method comprising:
   advertising a first Internet Protocol (IP) service at a first device over a service-oriented architecture (SOA) bus using a first service name associated with the first IP service, wherein a logical addressing scheme for service names on the SOA bus is distinct from access protocol addressing of devices coupled via the SOA bus;
   discovering a second IP service associated with a second service name advertised by a second device over the SOA bus, wherein each of the first service name and the second service name comprises a service descriptor uniformly associated with IP service at the SOA bus;
   transmitting at least a first IP packet to the second device by remotely invoking the second IP service of the second device over the SOA bus; and
   receiving at least a second IP packet from the second device over the SOA bus through the first IP service.

2. The method of claim 1, wherein the first service name associated with the first IP service further comprises a unique IP address assigned to the first device.

3. The method of claim 2, further comprising:
   dynamically generating an IP address for the first device;
   determining whether any other device on the SOA bus is associated with the dynamically generated IP address; and
   assigning the dynamically generated IP address to the first device as the unique IP address in response to a determination that no other device on the SOA bus is associated with the dynamically generated IP address.

4. The method of claim 3, further comprising:
   abandoning the dynamically generated IP address in response to a determination that another device on the SOA bus is associated with the dynamically generated IP address; and
   dynamically generating a new IP address for the first device.

5. The method of claim 3, wherein the determining whether any other device on the SOA bus is associated with the dynamically generated IP address comprises:
   determining that a different service on the SOA bus is associated with the dynamically generated IP address;
   determining that the different service comprises a unique identifier assigned to the first device;
   determining that the different service belongs to the first device based on the unique identifier.

6. The method of claim 2, wherein the second service name associated with the second IP service further comprises a unique IP address assigned to the second device.

7. The method of claim 6, wherein the first IP packet is addressed to the unique IP address assigned to the second device.

8. The method of claim 2, wherein the second IP packet is addressed to the unique IP address associated with the first device.

9. The method of claim 1, wherein the first service name associated with the first IP service and the second service name associated with the second IP service are advertised in a contiguous namespace implemented by the SOA bus.

10. The method of claim 1, wherein the first service name associated with the first IP service further comprises a hostname associated with the first device.

11. The method of claim 10, wherein the first service name associated with the first IP service further comprises a subdomain associated with the hostname.

12. The method of claim 1, wherein the first service name associated with the first IP service further comprises an indication of a subnet associated with the first IP service.

13. The method of claim 1, wherein the transmitting the first IP packet to the second device further comprises:
   invoking the second IP service over the SOA bus; and
   transmitting the first IP packet to the second IP service as a parameter associated with remotely invoking the second IP service.

14. The method of claim 1, wherein the transmitting the first IP packet to the second device occurs at a virtual network interface.

15. The method of claim 1, wherein the receiving the second IP packet from the second device further comprises:
  determining that the second device has invoked the first IP service over the SOA bus; and
  receiving the second IP packet as a parameter associated with remotely invoking the first IP service.

16. The method of claim 1, wherein the receiving the second IP packet from the second device occurs at a virtual network interface.

17. The method of claim 1, wherein the first device and the second device connect to the SOA bus using different access protocols.

18. The method of claim 17, wherein the SOA bus is implemented by a plurality of devices interconnected by heterogeneous radio technologies.

19. The method of claim 1, wherein the SOA bus is implemented by a peer-to-peer network.

20. A device comprising:
  an advertisement module configured to advertise a first Internet Protocol (IP) service over a service-oriented architecture (SOA) bus using a first service name associated with the first IP service, wherein a logical addressing scheme for service names on the SOA bus is distinct from access protocol addressing of devices coupled via the SOA bus;
  a discovery module configured to discover a second IP service associated with a second service name advertised by a second device over the SOA bus, wherein each of the first service name and the second service name comprises a service descriptor uniformly associated with IP service at the SOA bus;
  a transmitter configured to transmit at least a first IP packet to the second device by remotely invoking the second IP service of the second device over the SOA bus; and
  a receiver configured to receive at least a second IP packet from the second device over the SOA bus through the first IP service.

21. The device of claim 20, wherein the first service name associated with the first IP service further comprises a unique IP address assigned to the device.

22. The device of claim 20, wherein the first service name associated with the first IP service and the second service name associated with the second IP service are advertised in a contiguous namespace implemented by the SOA bus.

23. The device of claim 20, wherein the second service name associated with the second IP service further comprises a unique IP address assigned to the second device.

24. The device of claim 20, wherein the transmitter is configured to transmit the first IP packet to the second device by:
  invoking the second IP service over the SOA bus; and
  transmitting the first IP packet to the second IP service as a parameter associated with remotely invoking the second IP service.

25. The device of claim 20, wherein the receiver is configured to receive the second IP packet from the second device by:
  determining that the second device has invoked the first IP service over the SOA bus; and
  receiving the second IP packet as a parameter associated with remotely invoking the first IP service.

26. The device of claim 20, further comprising:
  a virtual network interface configured to:
    receive the first IP packet from an IP application implemented by the device;
    forward the first IP packet to the second IP service;
    receive the second IP packet from the first IP service; and
    forward the second IP packet to the IP application implemented by the device.

27. An apparatus comprising:
  means for advertising a first Internet Protocol (IP) service at a first device over a service-oriented architecture (SOA) bus using a first service name associated with the first IP service, wherein a logical addressing scheme for service names on the SOA bus is distinct from access protocol addressing of devices coupled via the SOA bus;
  means for discovering a second IP service associated with a second service name advertised by a second device over the SOA bus, wherein each of the first service name and the second service name comprises a service descriptor uniformly associated with IP service at the SOA bus;
  means for transmitting a first IP packet to the second device by remotely invoking the second IP service of the second device over the SOA bus; and
  means for receiving a second IP packet from the second device through the first IP service.

28. The apparatus of claim 27, wherein the first service name associated with the first IP service further comprises a unique IP address assigned to the first device.

29. The apparatus of claim 28, further comprising:
  means for dynamically generating an IP address for the first device;
  means for determining whether any other device on the SOA bus is associated with the dynamically generated IP address; and
  means for assigning the dynamically generated IP address to the first device as the unique IP address in response to a determination that no other device on the SOA bus is associated with the dynamically generated IP address.

30. The apparatus of claim 29, further comprising:
  means for abandoning the dynamically generated IP address in response to a determination that another device on the SOA bus is associated with the dynamically generated IP address,
  wherein the means for dynamically generating generates a new IP address for the first device.

31. The apparatus of claim 28, wherein the second service name associated with the second IP service further comprises a unique IP address assigned to the second device.

32. The apparatus of claim 31, wherein the first IP packet is addressed to the unique IP address assigned to the second Device.

33. The apparatus of claim 28, wherein the second IP packet is addressed to the unique IP address associated with the first device.

34. The apparatus of claim 27, wherein the first service name associated with the first IP service and the second service name associated with the second IP service are advertised in a contiguous namespace implemented by the SOA bus.

35. The apparatus of claim 27, wherein the means for transmitting the first IP packet to the second device further comprises:
  means for invoking the second IP service over the SOA bus; and
  means for transmitting the first IP packet to the second IP service as a parameter associated with remotely invoking the second IP service.

36. The apparatus of claim 27, wherein the means for transmitting the first IP packet to the second device comprises a virtual network interface.

37. The apparatus of claim 27, wherein the means for receiving the second IP packet from the second device further comprises:
- means for determining that the second device has invoked the first IP service over the SOA bus; and
- means for receiving the second IP packet as a parameter associated with remotely invoking the first IP service.

38. The apparatus of claim 27, wherein the means for receiving the second IP packet from the second device comprises a virtual network interface.

39. The apparatus of claim 27, wherein the first device and the second device connect to the SOA bus using different access protocols.

40. A non-transitory computer-readable medium storing computer-executable instructions that, when executed by a computer, cause the computer to:
- advertise a first Internet Protocol (IP) service at a first device over a service-oriented architecture (SOA) bus using a first service name associated with the first IP service, wherein a logical addressing scheme for service names on the SOA bus is distinct from access protocol addressing of devices coupled via the SOA bus;
- discover a second IP service associated with a second service name advertised by a second device over the SOA bus, wherein each of the first service name and the second service name comprises a service descriptor uniformly associated with IP service at the SOA bus;
- transmit at least a first IP packet to the second device by remotely invoking the second IP service of the second device over the SOA bus; and
- receive at least a second IP packet from the second device through the first IP service.

41. A system comprising:
- a service oriented architecture (SOA) bus configured to communicatively couple to a plurality of different devices using a plurality of different access technologies;
- a first device configured to advertise a first Internet Protocol (IP) service over the SOA bus using a first service name associated with the first IP service, wherein a logical addressing scheme for service names on the SOA bus is distinct from access protocol addressing of devices coupled via the SOA bus; and
- a second device configured to advertise a second IP service over the SOA bus using a second service name associated with the second IP service, wherein each of the first service name and the second service name comprises a service descriptor uniformly associated with IP service at the SOA bus;
- wherein the SOA bus enables the first device and the second device to exchange IP packets through remote invocations of the first IP service by the second device and remote invocations of the second IP service by the first device.

42. The system of claim 41, wherein:
the SOA bus is configured to implement a contiguous name space; and
the first service name and the second service name are each advertised within the contiguous name space.

43. The system of claim 41, wherein:
the first service name advertised by the first device comprises an IP address associated with the first device; and
the second service name advertised by the second device comprises an IP address associated with the second device.

* * * * *